United States Patent
Ding et al.

(10) Patent No.: US 9,173,116 B2
(45) Date of Patent: Oct. 27, 2015

(54) METHOD, APPARATUS AND SYSTEM FOR CONTROLLING ACCESS POINTS

(75) Inventors: Zhiming Ding, Shenzhen (CN); Yongli Yang, Shenzhen (CN); Guiming Shu, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 722 days.

(21) Appl. No.: 13/296,875

(22) Filed: Nov. 15, 2011

(65) Prior Publication Data

US 2012/0057503 A1   Mar. 8, 2012

Related U.S. Application Data

(63) Continuation of application No. PCT/CN2009/071816, filed on May 15, 2009.

(51) Int. Cl.
| H04W 24/04 | (2009.01) |
| H04W 52/02 | (2009.01) |
| H04W 48/16 | (2009.01) |
| H04W 88/08 | (2009.01) |

(52) U.S. Cl.
CPC .......... *H04W 24/04* (2013.01); *H04W 52/0206* (2013.01); *H04W 48/16* (2013.01); *H04W 88/08* (2013.01)

(58) Field of Classification Search
None
See application file for complete search history.

(56) References Cited

U.S. PATENT DOCUMENTS

| 6,584,330 | B1 * | 6/2003 | Ruuska .......................... 455/574 |
| 7,630,347 | B2 * | 12/2009 | Kaminski et al. ............. 370/338 |
| 7,990,863 | B2 * | 8/2011 | Yagyu et al. .................. 370/232 |
| 8,023,444 | B2 * | 9/2011 | Bowser et al. ................ 370/311 |
| 2007/0103303 | A1 | 5/2007 | Shoarinejad |
| 2007/0140163 | A1 | 6/2007 | Meier et al. |

(Continued)

FOREIGN PATENT DOCUMENTS

| CN | 1992657 A | 7/2007 |
| CN | 101119263 A | 2/2008 |

(Continued)

OTHER PUBLICATIONS

Office Action issued in corresponding Japanese Patent Application No. 2012-510089, mailed Jan. 29, 2013.

(Continued)

*Primary Examiner* — Chirag Shah
*Assistant Examiner* — Daniel Mitchell
(74) *Attorney, Agent, or Firm* — Brinks Gilson & Lione

(57) ABSTRACT

Embodiments of the present invention disclose a method, an apparatus and a system for controlling access points. The method includes: receiving load information on working APs in a coverage area; judging a current overall capacity of the coverage area according to the load information; and controlling APs in the coverage area according to a judgment result. A network management server includes a first receiving module, a first judgment module, and a first control module. The system includes the network management server, working APs, and non-working APs. The embodiments of the present invention also provide another method for controlling APs, a primary working AP, and a system for controlling APs. In the embodiments of the present invention, APs in the same coverage area are automatically controlled to turn on or off according to the service traffic; resources are utilized rationally; labor costs are saved; and the work efficiency is improved.

17 Claims, 6 Drawing Sheets

(56) References Cited

U.S. PATENT DOCUMENTS

| | | | |
|---|---|---|---|
| 2008/0031212 A1 | 2/2008 | Ogura | |
| 2008/0320108 A1* | 12/2008 | Murty et al. | 709/220 |
| 2010/0002610 A1* | 1/2010 | Bowser et al. | 370/311 |
| 2011/0051677 A1* | 3/2011 | Jetcheva et al. | 370/329 |
| 2011/0130143 A1 | 6/2011 | Mori et al. | |
| 2012/0008512 A1* | 1/2012 | Wahlqvist et al. | 370/252 |

FOREIGN PATENT DOCUMENTS

| | | |
|---|---|---|
| CN | 101347005 A | 1/2009 |
| EP | 2056628 A1 | 5/2009 |
| JP | 05-259967 | 10/1993 |
| JP | 07-170566 | 7/1995 |
| JP | 10-145842 | 5/1998 |
| JP | 2000-261844 | 9/2000 |
| JP | 2002-204478 | 7/2002 |
| WO | WO 02/07464 A1 | 1/2002 |
| WO | WO 2009022534 A1 | 2/2009 |

OTHER PUBLICATIONS

Appendix, drafted for Japanese Patent Application No. 2012-510089, undated.
Written Opinion of the International Searching Authority issued in corresponding PCT Patent Application No. PCT/CN2009/071816, mailed Feb. 25, 2010.
International Search Report issued in corresponding PCT Patent Application No. PCT/CN2009/071816, mailed Feb. 25, 2010.
Extended European Search Report issued in corresponding European Patent Application 09844516.6, mailed Jan. 4, 2012.
Alcatel-Lucent, "Capacity and Coverage SON Use Case" 3GPP TSG RAN-3#59, 10.1.1.c. Serrento, Italy, Feb. 2008. R3-080082.

\* cited by examiner

METHOD, APPARATUS AND SYSTEM FOR CONTROLLING ACCESS POINTS

CROSS-REFERENCE TO RELATED APPLICATIONS

This application is a continuation of International Application No. PCT/CN2009/071816, filed on May 15, 2009, which is hereby incorporated by reference in their entirety.

FIELD OF THE INVENTION

The present invention relates to communication technologies, and in particular to a method, an apparatus and a system for controlling access points (APs).

BACKGROUND OF THE INVENTION

With the rapid development of a wireless network technology, a Wireless Fidelity (WiFi) technology, as a short distance wireless communication technology, has been widely favored by users based on its advantages such as high transmission speed and long effective distance. An AP, as a bridge for connecting a wireless network and a wired network, is the core of the wireless network, and its main function is to connect wireless network clients together and then to connect the wireless network to the wired network, for example, the Ethernet. Currently, the AP has become one of the main approaches to wireless Internet access for users, and APs are configured in many public places such as airport lounges and cafes.

Currently, a bandwidth for wireless Internet access using the AP may be up to 54 Mbps. The coverage of the AP is usually 100 meters, and this range may accommodate thousands of people and even ten thousand people. However, if 1000 users access Internet through one AP at the same time, the bandwidth assigned to each user is only 54 Kbps. As a result, the users access Internet at a very low speed and even cannot enjoy multimedia services. Meanwhile, if the number of users within the same coverage area is relatively small, and when multiple APs covering the area is turned on at the same time, superfluous APs inevitably cause unnecessary power consumption. Therefore, it is required to implement control over APs according to actual situations. When service traffic is relatively large, it is required to turn on other APs to provide sufficient bandwidth for each user; and when service traffic is relatively small, it is required to turn off a certain AP or some APs, so as to save the unnecessary power consumption caused by the superfluous APs. In the prior art, the APs are controlled to be turned on or off manually, so that the APs in the same coverage area can be controlled. However, such a manner needs to make real-time statistics on the number of users and the working condition of the APs in the area manually, and APs cannot be controlled to be turned on or off automatically, resulting in higher labor costs and affecting the work efficiency.

SUMMARY OF THE INVENTION

Embodiments of the present invention is directed to provide a method, an apparatus and a system for controlling APs, so as to automatically control to turn on or off APs in the same coverage area according to service traffic, utilize resources rationally, save labor costs at the same time, and improve the work efficiency.

To achieve the forgoing objectives, an embodiment of the present invention provides a method for controlling APs, which includes:

receiving load information on working APs in a coverage area;

judging a current overall capacity of the coverage area according to the load information; and controlling APs in the coverage area according to a judgment result.

An embodiment of the present invention provides another method for controlling APs, which includes:

receiving, by a primary working AP, load information on secondary working APs in a coverage area;

judging, by the primary working AP, a current overall capacity of the coverage area according to own load information and load information on the secondary working APs; and controlling, by the primary working AP, APs in the coverage area according to a judgment result.

An embodiment of the present invention provides a network management server, which includes:

a first receiving module, configured to receive load information on working APs in a coverage area;

a first judgment module, configured to judge a current overall capacity of the coverage area according to the load information received by the first receiving module; and a first control module, configured to control APs in the coverage area according to a judgment result of the first judgment module.

An embodiment of the present invention further provides a primary working AP, which includes:

a second receiving module, configured to receive load information on secondary working APs in a coverage area;

a second judgment module, configured to judge a current overall capacity of the coverage area according to load information on the primary working AP and the load information on the secondary working APs received by the second receiving module; and a second control module, configured to control APs of the coverage area according to a judgment result of the second judgment module.

An embodiment of the present invention provides a system for controlling APs, which includes:

a network management server, configured to receive load information on one or more working APs in a coverage area, judge a current overall capacity of the coverage area according to the load information, and send a turn-off instruction message or a turn-on instruction message according to a judgment result;

the one or more working APs, configured to send the load information, and be turned off according to the turn-off instruction message; and one or more non-working APs, configured to be turned on according to the turn-on instruction message.

An embodiment of the present invention provides another system for controlling APs, which includes:

a primary working AP, configured to receive first load information on secondary working APs in a coverage area, judge a current overall capacity of the coverage area according to the first load information and own load information, and control APs in the coverage area according to a judgment result;

one or more of the secondary working APs, configured to send the first load information to the primary working AP, and be turned off under control of the primary working AP; and one or more non-working APs, configured to be turned on under control of the primary working AP.

According to the method, apparatus and system for controlling APs provided by the embodiments of the present invention, a network management server receives load information on working APs in the same coverage area, judges a current capacity according to the load information, controls to turn on non-working APs in the coverage area when the current capacity is larger than a preset upper capacity limit, and controls to turn off a certain working AP by sending a turn-off instruction message to the working APs when the current capacity is smaller than a preset capacity lower limit, which automatically controls to turn on or off the APs in the same coverage area according to the service traffic, utilizes resources rationally, saves labor costs at the same time, and improves the work efficiency.

DETAILED DESCRIPTION OF THE EMBODIMENTS

The technical solutions of the present invention are described in further details below with reference to the accompanying drawings and embodiments.

Figure 1:
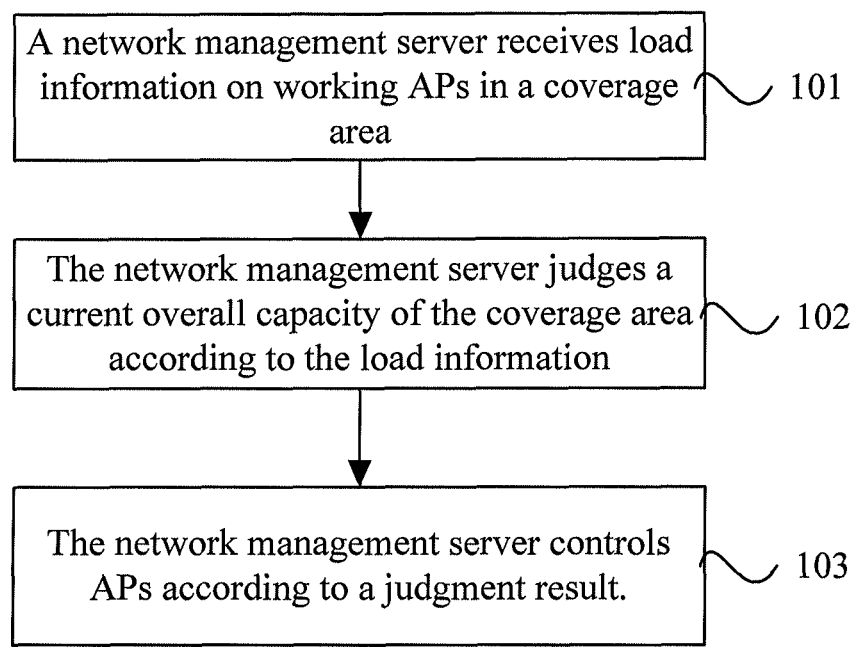
FIG. 1 is a flow chart of an embodiment of a method for controlling APs according to the present invention.

FIG. 1 is a flow chart of an embodiment of a method for controlling APs according to the present invention. As shown in FIG. 1, this embodiment describes the method for controlling APs from the network management server side, and the method for controlling APs provided by this embodiment includes the following steps.

Step 101: A network management server receives load information on working APs in a coverage area.

In this embodiment, a network management server is added to control APs in the same coverage area, and the network management server receives load information on one or more working APs in the coverage area. Multiple APs may exist in the same coverage area, where some APs are in a working state, and some APs are in an idle state. The idle state may be a turn-off state, or may be a dormant state with low power consumption and capable of being activated remotely. In this embodiment, APs in the working state are called working APs, and APs in the idle state are called non-working APs. The working APs may also be categorized into a primary working AP and secondary working APs. This embodiment is applicable to the situation where the APs are categorized into the primary AP and secondary APs as well as the situation where the APs are not categorized into the primary AP and secondary APs. The load information may be information on user number and bandwidth of the working APs, for example, the load information received by the network management server may be <maximum supported user number, current user number>, or <maximum available bandwidth, assigned bandwidth>, or <association failure> information, or any combination of the above information.

Step 102: The network management server judges a current overall capacity of the coverage area according to the load information.

The network management server judges a current overall capacity of the coverage area according to the received load information on the working APs, and controls an on state or off state of working APs and non-working APs according to a judgment result. The current overall capacity of the coverage area may be obtained according to the load information on the working APs; if the received load information on the working APs is <maximum supported user number, current user number>, through statistics processing on the load information, the current overall capacity of the coverage area may be <current user number/maximum supported user number>, where the current user number and the maximum supported user number are respectively a sum of access user number and supported user number of the working APs in the coverage area, or may be <assigned bandwidth/maximum available bandwidth>, or legal association failure events caused by insufficient bandwidth. If the maximum supported user number of the working APs in the coverage area is 10 and the current user number is 9, the current overall capacity of the coverage area is 0.9.

Step 103: The network management server controls APs in the coverage area according to a judgment result.

The network management server controls APs in the coverage area according to a judgment result on the current overall capacity of the coverage area. Specifically, the network management server may send a turn-on instruction message to a non-working AP to control to turn on the non-working AP, and the non-working AP returns a turn-on response to the network management server after being turned on and notify the network management server that the turn-on instruction has been performed successfully. Similarly, the network management server may send a turn-off instruction message to a working AP to control to turn off the working AP, and the working AP migrates users on the working AP to other working APs, turns off automatically, returns a turn-off response to the network management server, and notifies the network management server that the turn-off instruction has been performed successfully. The turn-on instruction message carries device identification information on the non-working AP, or information capable of identifying the AP such as a MAC address or an IP address; the turn-off instruction message carries device identification information on the working AP or information such as a MAC address or an IP address. The APs are controlled to be turned on or off according to the device identification information on the APs, or information such as the MAC address or IP address.

This embodiment provides a method for controlling APs, where a network management server receives load information on working APs in the same coverage area, judges a current capacity according to the load information, and controls to turn on or off the APs according to a judgment result, which automatically controls to turn on or off APs in the same coverage area according to the service traffic, utilizes resources rationally, saves labor costs at the same time, and improves the work efficiency.

Figure 2:
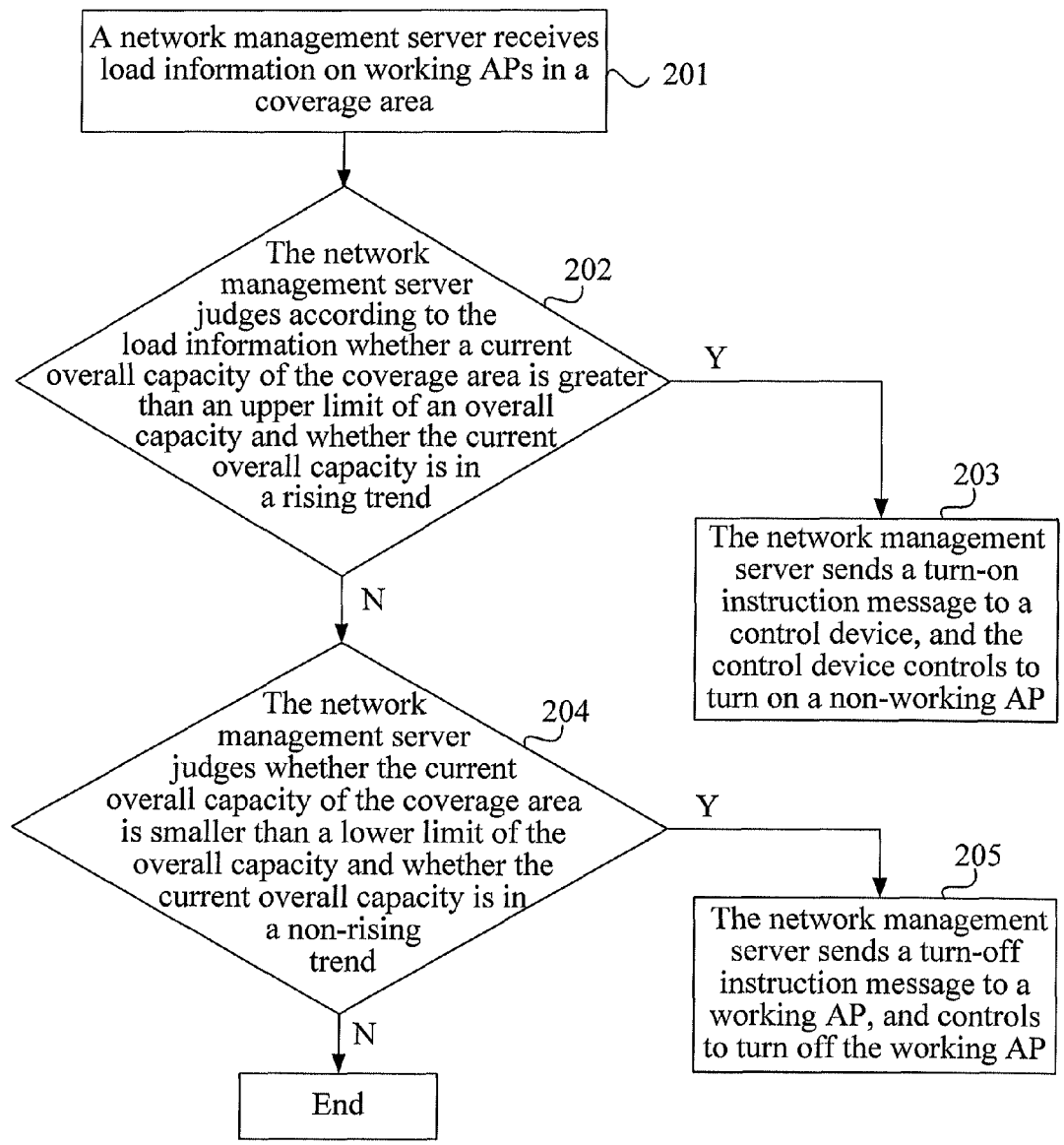
FIG. 2 is a flow chart of another embodiment of a method for controlling APs according to the present invention.

FIG. 2 is a flow chart of another embodiment of a method for controlling APs according to the present invention. As shown in FIG. 2, this embodiment provides a method for controlling APs, and implements control over APs through an independent control device on the basis of the above embodiment, which specifically includes the following steps.

Step 201: A network management server receives load information on working APs in a coverage area.

The network management server receives load information on one or more working APs in the coverage area. The load information may be reported to the network management server periodically through the working APs, that is, the working APs report their load information to the network management server periodically or when data changes or an event occurs. Alternatively, the load information may be obtained by sending a polling message to the working APs through the network management server, that is, the network management server sends a polling message to the working APs actively, and acquires the load information on the working APs through the polling message.

Step 202: The network management server judges according to the load information whether a current overall capacity of the coverage area is larger than an upper limit of an overall capacity and whether the current overall capacity is in a rising trend, and: if the current overall capacity of the coverage area is larger than the upper limit of the overall capacity and the current overall capacity is in a rising trend, step 203 is performed; if the current overall capacity of the coverage area is not larger than the upper limit of the overall capacity and the current overall capacity is not in a rising trend, step 204 is performed.

The network management server controls APs according to a judgment result on the current overall capacity of the coverage area, controls to turn on one non-working AP in the coverage area when judging that the current overall capacity is larger than an upper limit of an overall capacity, and controls to turn off one working AP in the coverage area when judging that the current overall capacity is smaller than a lower limit of the overall capacity. The upper limit of the overall capacity and the lower limit of the overall capacity may be set previously according to actual situations. If percentage is taken as a unit, the upper limit of the overall capacity may be set to 80% and the lower limit of the overall capacity may be set to 30% on the basis of the method for calculating the current overall capacity introduced in the above embodiment.

Furthermore, when the network management server controls the APs according to the judgment result, in addition to the relation between the current overall capacity of the coverage area and the preset upper limit and lower limit of the overall capacity, a change trend of the current overall capacity is also taken into consideration. When it is judged that the current overall capacity of the coverage area is larger than the upper limit of the overall capacity and that the current overall capacity is in a rising trend, it indicates that the load of the coverage area gradually increases and the service traffic in the coverage area is relatively large. The current overall capacity here may be load number of the coverage area, that is, the number of users accessing the coverage area currently. When the trend of the current overall capacity is judged, the number of users accessing the coverage area in a certain time period may be monitored. On the assumption that the time period is set to one minute, the number of users accessing the coverage area is monitored every other minute. On the assumption that the number of users monitored for the first time is 40, the second time is 60, and the third time is 80, it is evident that the current overall capacity of the coverage area is in a rising trend. Alternatively, when it is found that the current overall capacity exceeds the upper limit of the overall capacity, the overall capacity for the last few periods is checked by returning to the stored history data to judge the trend of the overall capacity, and the judgment method is the same as the above, which is not described in detail here. To ensure the bandwidth demands of the users, it is required to turn on a non-working AP in an idle state in the same coverage area to share the service traffic, and step 203 is performed; if it is not required to turn on a non-working AP in an idle state in the same coverage area to share the service traffic, step 204 is performed, step 204 is performed, and it is required to further judge the current overall capacity.

Step 203: The network management server sends a turn-on instruction message to a control device, and controls to turn on the non-working AP designated by the turn-on instruction message through the control device.

When it is judged that the current overall capacity in the same coverage area is larger than the preset upper limit of the overall capacity and the service traffic is still rising, it is indicated that the service traffic in the coverage area is relatively large and the current working APs cannot admit new users, and it is required to turn on an AP in the idle state to share the load of the working APs, so as to ensure the bandwidth demands of the users. In this embodiment, a control device is added between the network management server and the APs for controlling to turn on or off the APs. The control device at least includes a communication interface, a control port, and a Central Processing Unit (CPU). The control device is connected to a network through the communication interface to communicate with the network management server, and is connected to the APs in the coverage area through the control port, so as to implement control over the APs. When judging that it is required to turn on an AP in the idle state, the network management server sends a turn-on instruction message to the control device, and the turn-on instruction message carries device identification information on a non-working AP or information such as a MAC address or an IP address. After receiving the turn-on instruction message, the control device parses the message to acquire the device identification information on the non-working AP or information such as the MAC address or IP address carried in the message, and controls to turn on corresponding non-working AP according to the device identification information or the information such as the MAC address or IP address.

Specifically, in step 203, the controlling to turn on the non-working AP designated by the turn-on instruction message through the control device may include: acquiring, by the control device, the device identification information on the non-working AP to be controlled or information such as the MAC address or IP address from the received turn-on instruction message sent by the network management server, searching for a corresponding control port according to the device identification information or the information such as the MAC address or IP address, sending a turn-on signal to a non-working AP in a coverage area connected with the control port through the control port, and controlling to turn on the non-working AP by controlling a power switch relay in the non-working AP through the turn-on signal. The turn-on signal may be a pulse signal, a level signal, and the like. The turn-on signal in the following embodiments is also a pulse signal, a level signal, and the like, and is not described in detail here. A relay is set in the non-working AP to be controlled, and the control device closes the power switch relay in the AP to power on the AP. When the control device controls to turn on the AP by using a turn-on pulse or level signal, a connection line between the control port of the control device and the AP is an ordinary cable, and the controlled AP may be powered off thoroughly without supporting a dormant mode.

Specifically, in step 203, the controlling to turn on the non-working AP designated by the turn-on instruction message through the control device may include: acquiring, by the control device, the device identification information on the non-working AP to be controlled or the information such as the MAC address or IP address from the received turn-on instruction message sent by the network management server, searching for a corresponding control port according to the device identification information or the information such as the MAC address or IP address, sending a remote wake-up frame to a non-working AP in a coverage area connected with the control port through the control port, and starting the non-working AP through the remote wake-up frame. The remote wake-up frame is a special Media Access Control (MAC) frame, which designates a MAC address and a turn-on tag word. The turn-on tag word is generated by the AP and is sent to the network management server actively in the first running or set in the network management server by other means, and the turn-on tag word is included in the turn-on instruction message sent by the network management server. Also, the control device in the coverage area may store the turn-on tag word, and when it is required to start the AP through the remote wake-up frame, the control device finds a corresponding turn-on tag word through a device identifier of the AP in the turn-on instruction message, so as to send the remote wake-up frame to the designated AP to control to turn on the AP. When the control device controls to turn on the AP by using a remote wake-up frame, the control port of the control device is a network port, a connection line between the control device and the AP is a network cable, and the controlled AP cannot be powered off thoroughly and needs to support a dormant mode. It should be noted that, persons skilled in the art may understand that, the remote wake-up frame may have different specific implementations, which is not the focus of the embodiments of the present invention, and the details about this technology are not described here.

In step 203, the control device may also turn on the AP remotely by using a ZigBee technology. The ZigBee technology is a short-range wireless communication technology with a low rate and low power consumption, and is particularly suitable for control. When the AP is controlled to be turned on by using the ZigBee technology, the control device and the AP need a ZigBee communication module respectively, and it is unnecessary to connect a control cable. The controlling to turn on the non-working AP designated by the turn-on instruction message through the control device may include: acquiring, by the control device, the device identification information on the non-working AP to be controlled or the information such as the MAC address or IP address from the received turn-on instruction message sent by the network management server after processing of the CPU of the control device, further finding information on a ZigBee address of the ZigBee communication module of the non-working AP, and sending the turn-on instruction message to the ZigBee communication module of the control device through an internal circuit of the control device. The ZigBee communication module of the control device sends a ZigBee signal to the ZigBee communication module of the non-working AP corresponding to the ZigBee address by means of a wireless link, and after receiving the ZigBee signal, the ZigBee communication module of the non-working AP sends a pulse or level signal to a turn-on circuit of the AP, so as to control to turn on a main circuit of the AP. The turn-on signal may be a pulse signal, a level signal, and the like. A relay is set in the non-working AP to be controlled, and the ZigBee communication module inputs a pulse or level to close the relay, so as to turn on the AP. The ZigBee communication module of the AP needs to be capable of receiving an instruction even if the AP does not work. Therefore, the ZigBee communication module of the AP needs power all the time, which may be supplied by a battery or a power adapter attached to the AP; however, the ZigBee communication module of the control device may not use a battery to supply power, and the control device uses its own power when being connected to a power supply.

Furthermore, the control device may also be embedded in a local area network switch. When the control device is embedded in a local area network switch, the communication port of the control device for communication with the network management server is disposed in the switch and is connected to a downlink Ethernet port of the switch, and the control device controls control ports of the APs to multiplex output ports of the local area network switch with other downlink Ethernet ports of the local area network switch. At this time, the control device, as an independent module in the local area network switch, is configured as a control device module, which has its own MAC address and IP address and includes all components of the control device, such as the CPU, communication interface, and control port.

In one embodiment of the present invention, a switching module of the local area network switch including the control device module may share the CPU with the control device module. The local area network switch is accessed to the network through an uplink network port, and receives messages from the network and sends messages to the network through the uplink network port, including receiving a turn-on instruction message and a turn-off instruction message from the network management server. Multiple downlink Ethernet ports are included in the local area network switch, where some of the Ethernet ports are connected to external interfaces of the local area network switch through internal connection lines, so as to connect external Ethernet devices, and one of the Ethernet ports is connected to the communication interface of the control device module through the internal connection line, and is configured to transmit the turn-on instruction message and the turn-off instruction message sent from the network management server to the control device module. The control port of the control device module is connected to other external interfaces of the local area network switch respectively, so as to implement connection to the APs through the external interfaces of the local area network switch. The external interfaces of the local area network switch and network ports of the APs may implement information interaction through category-5 cables, and the category-5 cables have 4 pairs (8 wires) in total, where only 2 pairs (4 wires) are used in practice. In this embodiment, the control device is embedded into the local area network switch, and the control device may use one pair of idle wires in the cables to serve as a control line through the connection between the local area network switch and the APs, which may save a connection cable.

In this embodiment, the control device is embedded into the local area network switch, so that the local area network switch and the control device are disposed in the network as a whole, which saves physical space occupied by superfluous hardware devices and does not affect the control of the control device over the APs at the same time.

Step 204: The network management server judges according to the load information whether the current overall capacity of the coverage area is smaller than a lower limit of the overall capacity and whether the current overall capacity is in a non-rising trend, and: if the current overall capacity of the coverage area is smaller than the lower limit of the overall capacity and the current overall capacity is in a non-rising trend, step 205 is performed; if the current overall capacity of the coverage area is not smaller than the lower limit of the overall capacity and the current overall capacity is not in a non-rising trend, the process ends.

The network management server acquires the current overall capacity of the coverage area according to the received load information on the working APs, and the specific acquiring method may be the method described in the above embodiment, that is, judging the current overall capacity of the coverage area, and after judging that the current overall capacity is smaller than a preset upper limit of the overall capacity, continuing to judge whether the current overall capacity is smaller than a preset lower limit of the overall capacity and whether the current overall capacity is in a non-rising trend. The non-rising trend may be that the overall capacity of the coverage area is in a stable state, that is, the load number thereof is basically unchanged in a period of time, and the non-rising trend may also be that the overall capacity of the coverage area is in a falling state and the load of the coverage area gradually decreases. The current overall capacity here may be the load number of the coverage area, that is, the number of users accessing the coverage area currently, and the trend of the current overall capacity may be judged by monitoring the number of users accessing the coverage area in a certain time period. On the assumption that the time period is set to one minute, the number of users accessing the coverage area is monitored every other minute. On the assumption that the number of users monitored for the first time is 40, the second time is 60, and the third time is 80, it is evident that the current overall capacity of the coverage area is in a rising trend. When it is judged that the current capacity is smaller than a lower capacity limit and that the capacity is in a non-rising trend, it is indicated that the service traffic in the coverage area is relatively small, and one or more working APs may be turned off and users thereon may be migrated onto other working APs, so as to avoid a waste of resources. If the current overall capacity is not lower than the preset lower capacity limit, it indicates that the current service traffic is in a normal state, and therefore, the process ends.

Furthermore, the network management server may also judge a current capacity of each working AP respectively. If the network management server, upon judgment, finds that a current capacity of a certain working AP is smaller than a preset lower capacity limit, it is indicated that the load of the working AP is always light, for example, the working AP always has one or two users, and finds that the overall capacity of the coverage area is not in a rising state, users on the working AP may be migrated onto other APs in the same coverage area, and the particular working AP may be turned off. The lower capacity limit here is different from the above-mentioned lower limit of the overall capacity, because the lower limit of the overall capacity is directed to all working APs in the coverage area, while the lower capacity limit is directed to a single working AP.

Step 205: The network management server sends a turn-off instruction message to one working AP in the coverage area, and controls to turn off the working AP according to the turn-off instruction message.

When it is judged that the current overall capacity in the coverage area is smaller than a preset lower capacity limit, or a capacity of a certain AP is always small, and the current overall capacity is in a non-rising trend, it is indicated that the service traffic in the coverage area is relatively small and the number of APs turned on currently is relatively large, and it is required to turn off a certain AP therein to save resources. Specifically, the network management server sends a turn-off instruction message to one working AP in the coverage area, where the turn-off instruction message may carry an IP address or other identification information on a destination AP to which the load is migrated, and the number of the migration destination AP may be one or more. After receiving the turn-off instruction message, the working AP firstly migrates the users connected thereto onto other APs designated by the turn-off instruction message or found by itself. The specific migration process is not the focus of the embodiments of the present invention, and persons skilled in the art may refer to existing technical standards to implement the migration or define the implementation process. After completing user migration, the AP to be turned off may return a turn-off response to the network management server to indicate that the turn-off operation is completed, and then is turned off automatically. It should be noted that, the turn-off here may be turning off the power or entering a dormant state capable of being waked up remotely.

This embodiment provides a method for controlling APs, where a network management server receives load information on working APs in the same coverage area and judges a current capacity according to the load information; when the current capacity is larger than a preset upper capacity limit and the current capacity is in a rising trend, the network management server controls to turn on non-working APs in the coverage area through a control device; when the current capacity is smaller than a preset lower capacity limit and the current capacity is in a non-rising trend, the network management server controls to turn off a certain working AP by sending a turn-off instruction message to the working AP, which automatically controls to turn on or off APs in the same coverage area according to the service traffic, utilizes resources rationally, saves labor costs at the same time, and improves the work efficiency.

Figure 3:
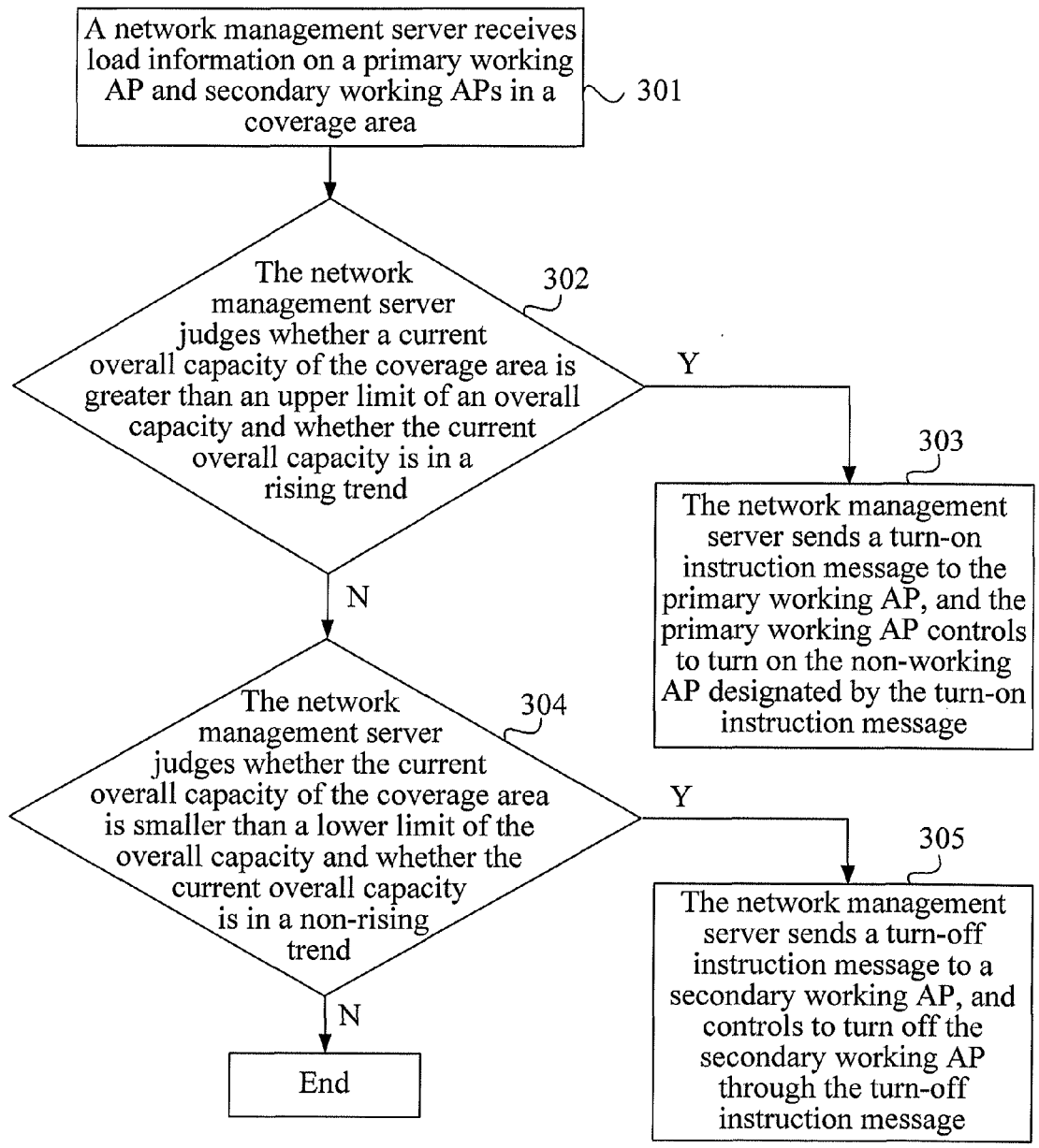
FIG. 3 is a flow chart of another embodiment of a method for controlling APs according to the present invention.

FIG. 3 is a flow chart of yet another embodiment of a method for controlling APs according to the present invention. As shown in FIG. 3, the embodiment of the present invention provides a method for controlling APs. This embodiment is on the basis of the above embodiments, where APs in the same coverage area include a primary working AP and one or more secondary APs, and the method specifically includes the following steps.

Step 301: A network management server receives load information on a primary working AP and secondary working APs in a coverage area.

In this embodiment, APs in the coverage area are categorized into a primary AP and secondary APs, where the primary AP is always in a working state, and some of the secondary APs are in a working state and some are in an idle state. Therefore, the APs in the working state are categorized into a primary working AP and secondary working APs, and the APs in the idle state are non-working APs. The load information received by the network management server is load information on the primary working AP and the secondary working APs in the coverage area. The load information may be reported to the network management server periodically through the primary working AP and the secondary working APs respectively, or the network management server sends a polling message to the primary working AP and the secondary working APs actively, and load information on the primary working AP and at least one secondary working AP is acquired through the polling message.

Step 302: The network management server judges according to the load information whether a current overall capacity of the coverage area is larger than an upper limit of an overall capacity and whether the current overall capacity is in a rising trend, and: if the current overall capacity of the coverage area is larger than the upper limit of an overall capacity and the current overall capacity is in a rising trend, step 303 is performed; if the current overall capacity of the coverage area is not larger than the upper limit of an overall capacity and the current overall capacity is not in a rising trend, step 304 is performed.

The network management server acquires a current overall capacity of the coverage area according to the received load information on the primary working AP and the secondary working APs, and the specific acquiring method may be the method described in the above embodiments, that is, by judging a current overall capacity of the coverage area, judging whether the current overall capacity is larger than an upper limit of an overall capacity and whether the current overall capacity is in a rising trend, that is, judging whether the overall service traffic in the coverage area exceeds the preset upper limit. If the current overall capacity is larger than the upper limit of the overall capacity and the current overall capacity is in the rising trend, step 303 is performed, and it is required to control APs in the same coverage area and to share the service traffic of the working APs by turning on standby APs. If the current overall capacity does not exceed the upper limit of the overall capacity, step 304 is performed, and it is required to further judge the current overall capacity.

Step 303: The network management server sends a turn-on instruction message to the primary working AP, and the primary working AP controls to turn on a non-working AP designated by the turn-on instruction message.

When it is judged that a sum of current capacities of the primary working AP and the secondary working APs in the same coverage area is larger than a preset upper limit of an overall capacity, it is indicated that the service traffic in the coverage area is relatively large, and it is required to turn on an AP in the idle state to share the load of the working APs, so as to ensure the bandwidth demands of the users. The network management server sends a turn-on instruction message to the primary working AP, where the turn-on instruction message includes identification information on the AP to be turned on, such as unique device identification information or a MAC address or a statically configured IP address, and the primary working AP controls to turn on the non-working AP according to the non-working AP designated by the turn-on instruction message.

Specifically, the primary working AP controls to turn on the non-working AP to be turned on in the following manner.

A control circuit in the primary working AP sends a turn-on signal to the non-working AP designated by the turn-on instruction message, and controls to turn on the non-working AP by controlling a relay in the non-working AP. The primary working AP includes a control circuit, and a CPU of the primary working AP may send a turn-on signal to the control circuit, so that a cable through which the control circuit is connected to the non-working AP generates an electric pulse or changed level, the electric pulse or changed level is output through an electric signal output port of the primary working AP, and a power switch relay of the non-working AP is closed, thereby powering on the non-working AP. The primary working AP has multiple electric signal output ports, so as to connect multiple non-working APs. It should be noted that, the specific implementation is well-known knowledge for persons of ordinary skill in the art, and is not described in detail here.

Alternatively, a remote wake-up frame is sent to the non-working AP designated by the turn-on instruction message through an Ethernet local area network switching circuit in the primary working AP, and the non-working AP is controlled to be turned on through the remote wake-up frame. An Ethernet local area network switching circuit is embedded in the primary working AP, and the Ethernet local area network switching circuit has multiple Ethernet ports connected to different non-working APs respectively. The non-working AP also has an Ethernet port, and the Ethernet port supports the remote wake-up function. The non-working AP is in a dormant state when not working, but is not completely powered off. The primary working AP sends a remote wake-up frame to the Ethernet port of the non-working AP through the Ethernet local area network switching circuit embedded in the primarily working AP, and controls to power on a main circuit of the non-working AP through the remote wake-up frame.

Alternatively, a ZigBee communication module in the primary working AP sends a ZigBee signal to a ZigBee communication module in the non-working AP designated by the turn-on instruction message, and the non-working AP is controlled to be turned on through the ZigBee signal. The primary working AP and the non-working AP both include a ZigBee communication module. The ZigBee communication module of the non-working APs is powered by a battery or a power adapter of the AP, and when the main circuit does not work, the ZigBee communication module is still in the working state. The ZigBee communication module of the primary working AP may not use a battery to supply power, but uses the same power supply with the main circuit, and when the main circuit does not work, the ZigBee communication module of the primary working AP does not need to work. The CPU of the primary working AP sends the turn-on instruction message to the ZigBee communication module included in the CPU of the primary working AP, and the turn-on instruction message includes an address of the ZigBee communication module of the AP to be turned on. Also, device identification information on the AP to be turned on may be sent to the ZigBee communication module of the primary working AP, and an address of the corresponding ZigBee communication module is queried according to the device identification information. After receiving the turn-on instruction message, the ZigBee communication module of the primary working AP sends a message to the ZigBee communication module of the non-working destination AP. After receiving the turn-on instruction, the ZigBee communication module of the non-working destination AP powers on the main circuit of the non-working AP through an internal control circuit.

Step 304: The network management server judges according to the load information whether the current overall capacity of the coverage area is smaller than a lower limit of the overall capacity and whether the current overall capacity is in a non-rising trend, and: if the current overall capacity of the coverage area is smaller than the lower limit of the overall capacity and the current overall capacity is in a non-rising trend, step 305 is performed; if the current overall capacity of the coverage area is not smaller than the lower limit of the overall capacity and the current overall capacity is not in a non-rising trend, the process ends.

The network management server acquires the current overall capacity of the coverage area according to the received load information on the primary working AP and the secondary working APs, and the specific acquiring method may be the method described in the above embodiments, that is, judging the current overall capacity of the coverage area, and after judging that the current overall capacity is smaller than the preset upper limit of the overall capacity, continuing to judge whether the current overall capacity is smaller than a preset lower limit of the overall capacity and whether the current overall capacity is in a non-rising trend, that is, judging whether the overall service traffic processed by the primary working AP and the secondary working APs in the coverage area is lower than the preset lower limit. If the current overall capacity is smaller than the preset lower limit of the overall capacity and the current overall capacity is in the non-rising trend, step 305 is performed, and it is required to control APs in the same coverage area and turn off a certain working AP to reduce a waste of resources. If the current overall capacity is not lower than the preset lower capacity limit, it indicates that the current service traffic is in a normal state, and the process ends.

Alternatively, the network management server may also judge the current capacity of each secondary working AP respectively, and if a current capacity of a certain working AP is smaller than the preset lower capacity limit, that is, the load of the secondary working AP is always light, and the load of the AP may be transferred to other working APs, a turn-off instruction message may be sent to the secondary working AP to turn it off.

Step 305: The network management server sends a turn-off instruction message to the secondary working AP, and controls to turn off the secondary working AP through the turn-off instruction message.

When it is judged that the current overall capacity of the primary working AP and the secondary working APs in the same coverage area is smaller than the preset lower limit of the overall capacity, it is indicated that the service traffic in the coverage area is relatively small and the number of APs turned on currently is relatively large, and it is required to turn off a certain AP to save resources. Specifically, the network management server uses a turn-off instruction message to send an IP address of a secondary working AP to be turned off. After receiving the turn-off instruction message, the secondary working AP firstly migrates users connected thereto to a designated secondary working AP, and after completing the user migration, the AP to be turned off may return a turn-off response to the network management server to indicate that the turn-off operation is completed, and then is turned off automatically.

This embodiment provides a method for controlling APs, where a network management server receives load information on a primary working AP and secondary working APs, and judges a current capacity according to the load information; when the current capacity is larger than a preset upper capacity limit, the network management server turns on one non-working AP through the primary working AP; when the current capacity is smaller than a preset lower capacity limit, the network management server directly turns off a certain non-working AP, which automatically controls to turn on or off APs in the same coverage area according to the service traffic, utilizes resources rationally, saves labor costs at the same time, and improves the work efficiency.

Figure 4:
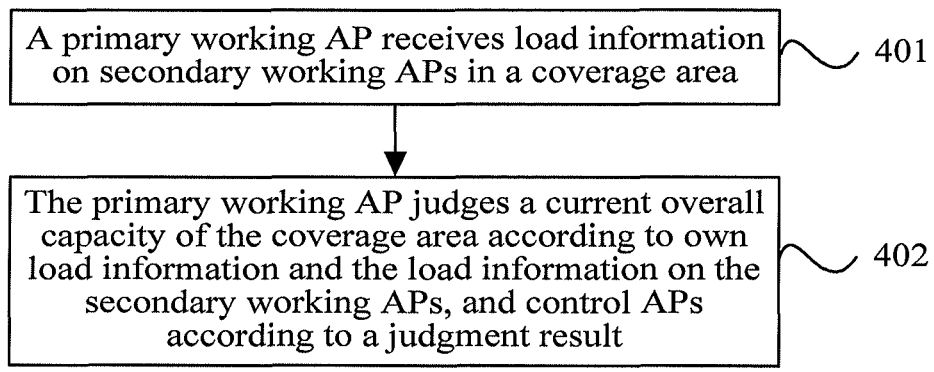
FIG. 4 is a flow chart of another embodiment of a method for controlling APs according to the present invention.

FIG. 4 is a flow chart of still another embodiment of a method for controlling APs according to the present invention. As shown in FIG. 4, the embodiment of the present invention provides another method for controlling APs, and the method provided by this embodiment is an AP autonomous method, which controls to turn on or off secondary APs through a primary AP in a coverage area. The method specifically includes the following steps.

Step 401: A primary working AP receives load information on secondary working APs in a coverage area.

In this embodiment, the APs are categorized into a primary AP and secondary APs. The APs in a working state include a primary working AP and secondary working APs, and the APs in an idle state are called non-working APs. The primary working AP controls to turn on or off the secondary working APs. The APs in the same coverage area are interconnected through communication manners such as Ethernet, WiFi, and ZigBee, and exchange load information there-between, and when the load of one AP is relatively heavy, some of the users therein may be migrated to other working APs, but when the load of all the working APs is heavy, the bandwidth required by the users cannot be satisfied through the user migration among the APs. In this embodiment, the primary working AP implements the function of the network management server described in the foregoing embodiments, and may receive load information on secondary working APs in the coverage area. The load information may be reported to the primary working AP periodically through the secondary working APs, or the primary working AP actively sends a polling message to the secondary working APs and load information on the secondary working APs is acquired through the polling message.

Step 402: The primary working AP judges a current overall capacity of the coverage area according to the load information on the secondary working APs and load information on the primary working AP, and controls the APs in the coverage area according to a judgment result.

The primary working AP judges a current overall capacity of the coverage area according to the received load information and load information on the primary working AP, and when the current overall capacity of the coverage area is larger than an upper limit of an overall capacity, the primary working AP controls to turn on one non-working AP in the coverage. Specifically, the primary working AP sends a turn-on signal to one non-working AP in the coverage area, and controls to turn on the non-working AP by controlling a relay in the non-working AP through the turn-on signal. Alternatively, the primary working AP sends a remote wake-up frame to one non-working AP in the coverage area, and controls to turn on the non-working AP through the remote wake-up frame. Alternatively, the primary working AP sends a ZigBee signal to a ZigBee communication module of one non-working AP in the coverage area through a ZigBee communication module there, and controls to turn on the non-working AP through the ZigBee signal. When the current overall capacity of the coverage area is smaller than a lower limit of the overall capacity, the primary working AP sends a turn-off instruction message to one secondary working AP in the coverage area through the WiFi protocol, and controls to turn off the secondary working AP according to the turn-off instruction message.

Alternatively, when it is judged that a current capacity of a secondary working AP in the coverage area is smaller than a lower capacity limit and that the current overall capacity of the coverage area is in a non-rising trend, the secondary working AP is controlled to be turned off. That is, if the primary working AP finds that a capacity of a certain secondary working AP is always low, for example, the secondary working AP has only one or two users, and finds that the current overall capacity of the coverage area is not in a rising trend, the primary working AP may send a turn-off instruction message to the secondary working AP to control to turn off the secondary working AP.

In this embodiment, the primary AP and the secondary APs exchange load information through a WiFi channel. Certainly, if an Ethernet remote wake-up technology is adopted to enable the turn on the non-working AP during specific implementation, Ethernet may also be used to exchange load information between the primary AP and the secondary APs. When the Ethernet remote wake-up technology is used, the secondary APs in the idle state need to support a dormant mode, when there is no load, the secondary APs enter the dormant mode and support the Ethernet remote wake-up technology, and when necessary, the primary working AP turns on the non-working AP in the idle state by using the Ethernet remote wake-up technology. Ethernet may also be used to connect the primary AP and the secondary APs to exchange load information, and the non-working AP is controlled still through a pulse or level electric signal. At this time, the primary AP and the secondary APs may implement information interaction through category-5 cables, and the category-5 cables have 4 pairs (8 wires) in total, where only 2 pairs (4 wires) are used in practice. Therefore, the primary AP and the secondary APs may be connected by using one pair of idle lines in the cables to serve as a turn-on control line, which may save a connection cable.

This embodiment provides a method for controlling APs, where a primary working AP receives load information on working APs in the same coverage area, and judges a current capacity according to the load information; when the current capacity is larger than a preset upper capacity limit, the primary working AP controls to turn on a non-working AP in the coverage area; when the current capacity is smaller than a preset lower capacity limit, the primary working AP sends a turn-off instruction message to secondary working AP to control to turn off a certain secondary working AP, which automatically controls to turn on or off APs in the same coverage area according to the service traffic, utilizes resources rationally, saves labor costs at the same time, and improves the work efficiency.

Figure 5:
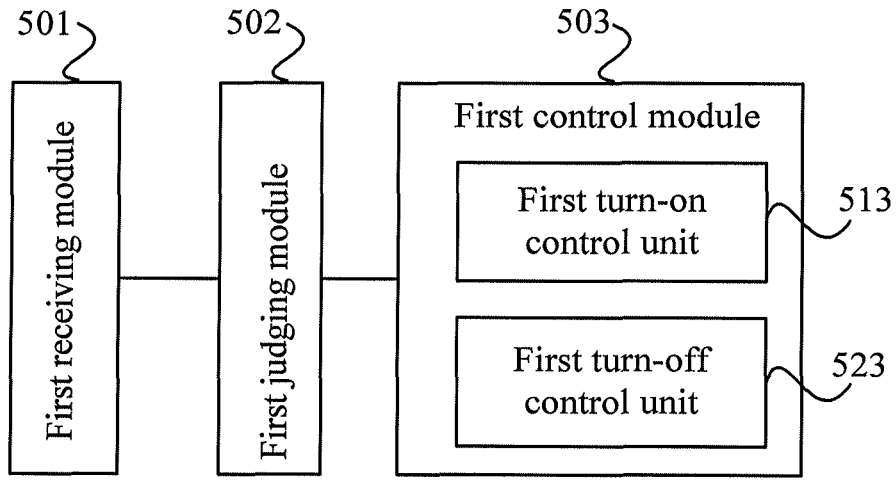
FIG. 5 is a schematic structural diagram of an embodiment of a network management server according to the present invention.

FIG. 5 is a schematic structural diagram of an embodiment of a network management server according to the present invention. As shown in FIG. 5, an embodiment of the present invention provides a network management server, which specifically includes a first receiving module 501, a first judgment module 502, and a first control module 503. The first receiving module 501 receives load information on working APs in a coverage area. The first judgment module 502 judges a current overall capacity of the coverage area according to the load information received by the first receiving module 501. The first control module 503 is configured to control APs in the coverage area according to a judgment result of the first judgment module 502.

Specifically, the first control module 503 may include a first turn-on control unit 513 and a first turn-off control unit 523. The first turn-on control unit 513 is configured to control to turn on one non-working AP in the coverage area when the judgment result of the first judgment module 502 is that the current overall capacity is larger than an upper limit of an overall capacity. The first turn-off control unit 523 is configured to control to turn off one working AP in the coverage area when the judgment result of the first judgment module 502 is that the current overall capacity is smaller than a lower limit of the overall capacity. Specifically, the first turn-on control unit 513 is specifically configured to control to turn on one non-working AP in the coverage area when the judgment result of the first judgment module 502 is that the current overall capacity is larger than the upper limit of the overall capacity and the current overall capacity is in a rising trend; the first turn-off control unit 523 is specifically configured to control to turn off one working AP in the coverage area when the judgment result of the first judgment module 502 is that the current overall capacity is smaller than the lower limit of the overall capacity and the current overall capacity is in a non-rising trend. The first turn-off control unit 523 is specifically configured to control to turn off a certain working AP in the coverage area by sending a turn-off instruction message to the working AP when the judgment result of the first judgment module 502 is that a capacity of the working AP is smaller than a lower capacity limit and the current overall capacity is in a non-rising trend. More specifically, the first turn-on control unit 513 is configured to send a turn-on instruction message to a control device and control to turn on a non-working AP designated by the turn-on instruction message through the control device when the judgment result of the first judgment module 502 is that the current overall capacity is larger than the upper limit of the overall capacity and the current overall capacity is in the rising trend; the first turn-off control unit 523 is specifically configured to control to turn off one working AP in the coverage area by sending a turn-off instruction message to the working AP when the judgment result of the first judgment module 502 is that the current overall capacity is smaller than the lower limit of the overall capacity and the current overall capacity is in the non-rising trend.

When acquiring the judgment result of the first judgment module 502 that it is required to turn on a new non-working AP, the first turn-on control unit 513 selects a candidate non-working AP for turn-on processing. The details are specifically as follows: the first turn-on control unit 513 sends a turn-on instruction message to the non-working AP, the turn-on instruction message includes identification information on the non-working AP to be turned on, and the identification information may be a unique device identifier, a MAC address, and an available static IP address of the non-working AP. The turn-on instruction message may be sent to a control device in an AP coverage area. The first turn-on control unit 513 may also directly send a remote wake-up frame to the non-working AP to be turned on, and directly wake up the non-working AP in a dormant state through the remote wake-up frame. When acquiring the judgment result of the first judgment module 502 that it is required to turn off a working AP, the first turn-off control unit 523 sends a turn-off instruction message to the working AP designated by the first judgment module 502 or a certain working AP selected by itself. The turn-off instruction message may indicate a migration destination working AP, so that the load on the working AP to be turned off can be migrated to the migration destination working AP before the working AP is turned off.

Alternatively, when the working APs include a primary working AP and secondary working APs, the first receiving module 501 is specifically configured to receive load information on the primary working AP and the secondary working APs in the coverage area. The first turn-on control unit 513 is further specifically configured to send a turn-on instruction message to a primary working AP and control to turn on a non-working AP designated by the turn-on instruction message through the primary working AP when the judgment result of the first judgment module 502 is that the current overall capacity is larger than the upper limit of the overall capacity and the current overall capacity is in the rising trend. The first turn-off control unit 523 is specifically configured to control to turn off one secondary working AP in the coverage area by sending a turn-off instruction message to the secondary working AP through the primary working AP when the judgment result of the first judgment module 502 is that that the current overall capacity is smaller than the lower limit of the overall capacity and the current overall capacity is in the non-rising trend. The first turn-off control unit 523 is further specifically configured to control to turn off a certain secondary working AP in the coverage area by sending a turn-off instruction message to the secondary working AP when the judgment result of the first judgment module 502 is that that a capacity of the secondary working AP is smaller than a lower capacity limit and the current overall capacity is in the non-rising trend.

This embodiment provides a network management server, which automatically controls to turn on or off APs in the same coverage area according to the service traffic, utilizes resources rationally, saves labor costs at the same time, and improves the work efficiency by setting a first receiving module, a first judgment module, and a first control module.

Figure 6:
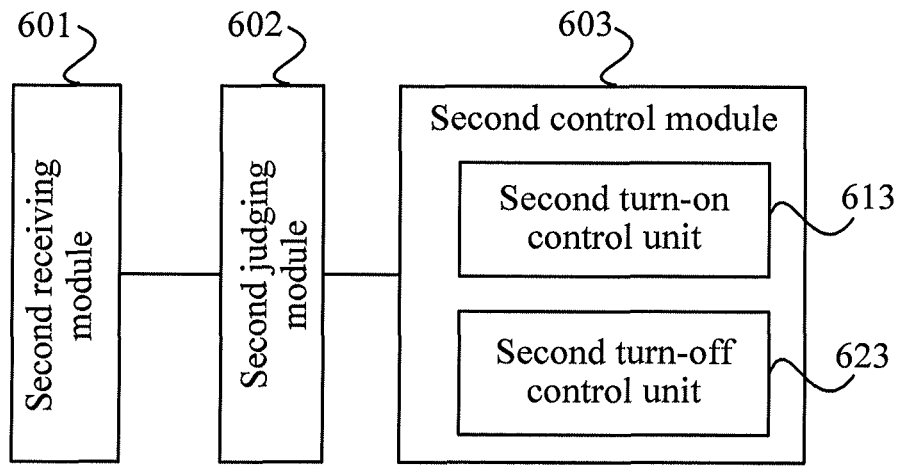
FIG. 6 is a schematic structural diagram of an embodiment of a primary working AP according to the present invention.

FIG. 6 is a schematic structural diagram of an embodiment of a primary working AP according to the present invention. As shown in FIG. 6, an embodiment of the present invention provides a primary working AP. Working APs in this embodiment are categorized as the primary working AP and secondary working AP, where the primary working AP includes a second receiving module 601, a second judgment module 602, and a second control module 603. The second receiving module 601 is configured to receive load information on secondary working APs in a coverage area, and the load information may be reported to the primary working AP periodically through the secondary working APs, or the primary working AP sends a polling message to the secondary working APs and acquires the load information on the secondary working APs through the polling message. The second judgment module 602 is configured to judge a current overall capacity of the coverage area according to load information on the primary working AP and the load information on the secondary working APs received by the second receiving module 601.

Specifically, the second control module 603 in this embodiment may specifically include a second turn-on control unit 613 and a second turn-off control unit 623. The second turn-on control unit 613 is configured to control to turn on one non-working AP in the coverage area when the judgment result of the second judgment module 602 is that the current overall capacity is larger than an upper limit of an overall capacity. The second turn-off control unit 623 is configured to control to turn off one secondary working AP in the coverage area when the judgment result of the second judgment module 602 is that the current overall capacity is smaller than a lower limit of an overall capacity. More specifically, the second turn-on control unit 613 is specifically configured to control to turn on one non-working AP in the coverage area when the judgment result of the second judgment module 602 is that the current overall capacity is larger than the upper limit of the overall capacity and the current overall capacity is in a rising trend. Specifically, a non-working AP is controlled to be turned on by controlling a relay in the non-working AP through a turn-on signal, or the non-working AP is controlled to be turned on through a remote wake-up frame or a ZigBee signal. The second turn-off control unit 623 is specifically configured to control to turn off one secondary working AP in the coverage area when the judgment result of the second judgment module 602 is that the current overall capacity is smaller than the lower limit of the overall capacity and the current overall capacity is in a non-rising trend. Specifically, a turn-off instruction message is sent to one secondary working AP in the coverage area through the WiFi protocol, and the secondary working AP is controlled to be turned off through the turn-off instruction message.

This embodiment provides a primary working AP, which automatically controls to turn on or off APs in the same coverage area according to the service traffic, utilizes resources rationally, saves labor costs at the same time, and improves the work efficiency by setting a second receiving module, a second judgment module, and a second control module.

Figure 7:
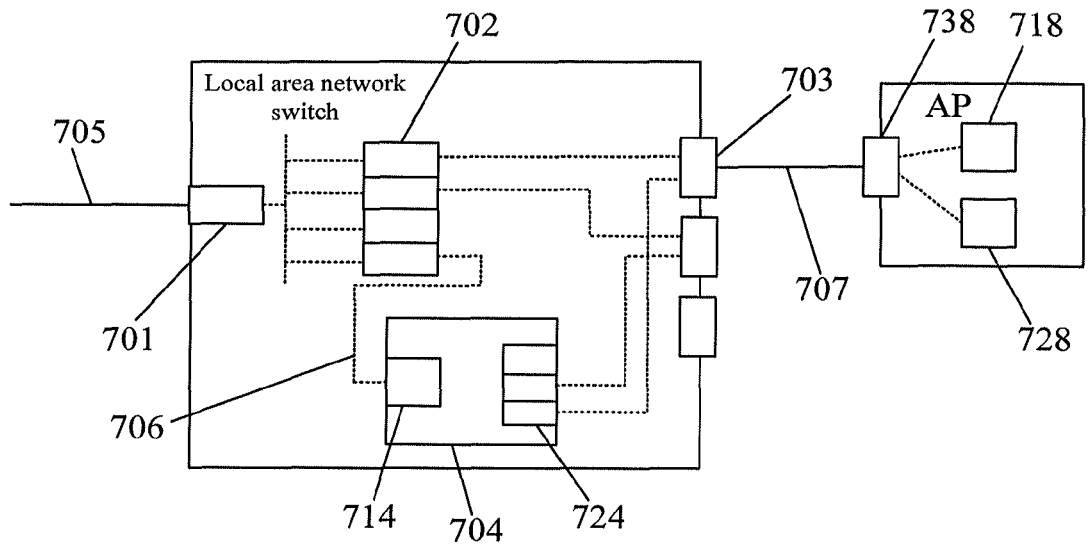
FIG. 7 is a schematic structural diagram of an embodiment of a local area network switch according to the present invention.

FIG. 7 is a schematic structural diagram of an embodiment of a local area network switch according to the present invention. As shown in FIG. 7, an embodiment of the present invention provides a local area network switch, which includes a control device 704, and further includes a communication interface 701 connected to a network management server, a downlink network port 702 connected to a communication port of the control device 704, and an output port 703 multiplexed with a control port 724 of the control device 704. The control port 724 of the control device 704 outputs a pulse or level signal by using two idle lines in the rest downlink network ports 702 of the local area network switch.

Figure 8:
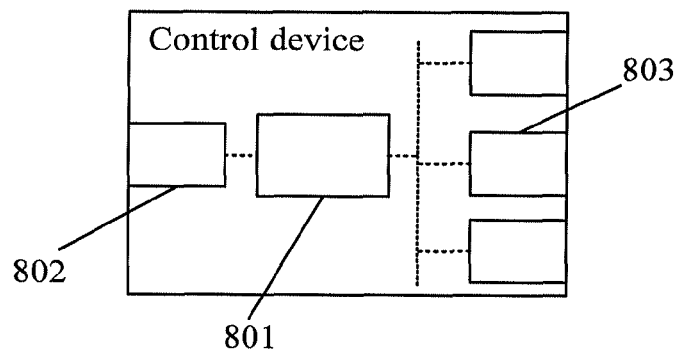
FIG. 8 is a schematic structural diagram of a control device in the embodiment of a local area network switch according to the present invention.

In this embodiment, a control device is embedded into a local area network switch, and a turn-on pulse is transmitted by using a pair of twisted pair cables that are not used in the network cable as the control line. FIG. 8 is a schematic structural diagram of a control device in an embodiment of the local area network switch according to the present invention. The control device at least includes a CPU 801, a communication port 802 connected to the network management server, and at least one control port 803 connected to APs respectively. The control device receives a turn-on instruction message sent by the network management server through the communication port 802, and controls to turn on a non-working AP in a coverage area through the control port 803 according to the turn-on instruction message. The communication port 802 is connected to a network, and receives the turn-on instruction from the network management server. The control port 803 is connected to the AP, and is configured to control to turn-on the AP. When the control device starts the AP by means of pulse or level, in fact, the outside of the control port 803 is an ordinary cable connection terminal. When the control device uses an Ethernet port to send a remote wake-up frame to start the AP, the control port 803 is a network port. It should be noted that, the control device provided by this embodiment further includes modules or components such as a memory, which is not shown in FIG. 8, but should be understood by persons skilled in the art.

Figure 9:
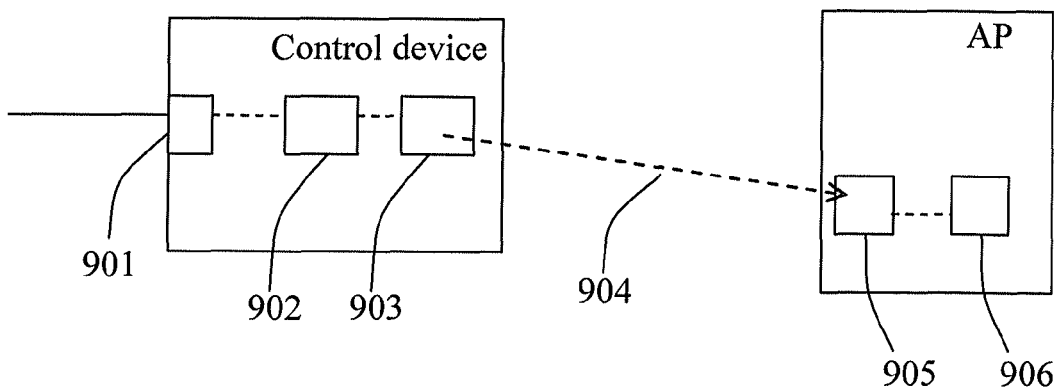
FIG. 9 is a schematic diagram of a connection mode in an embodiment of a control device in an embodiment of a local area network switch according to the present invention.

Specifically, in order to further illustrate the control of the control device over turn-on of APs by using the ZigBee technology, FIG. 9 shows a schematic diagram of a connection mode in an embodiment of the control device in an embodiment of the local area network switch according to the present invention. As shown in FIG. 9, the control device at least includes an uplink communication port 901, a CPU 902, and a ZigBee communication module 903. The control device receives a turn-on instruction message from the network management server through the communication port 901, where the turn-on instruction message, after being processed by the CPU 902 of the control device, sends necessary information on a non-working AP to turned on, for example, device identifier, or information on a MAC address of a ZigBee communication module 905 in the non-working AP to be turned on, to the ZigBee communication module 903 of the control device through an internal circuit of the control device. If the information obtained by the ZigBee communication module 903 of the control device does not include the MAC address of the ZigBee communication module 905 in the non-working AP to be turned on but includes identification information on the non-working AP to be turned on, the ZigBee communication module 903 of the control device looks up a table to obtain the MAC address of the ZigBee communication module 905 corresponding to an identifier of the destination non-working AP. The ZigBee communication module 903 of the control device sends the turn-on instruction message to the ZigBee communication module 905 of the destination AP through a wireless link 904 in the form of a ZigBee signal. The ZigBee communication module 905 of the AP is responsible for receiving the ZigBee signal sent by the control device. After receiving the turn-on instruction message, the ZigBee communication module 905 of the AP sends a pulse or level signal to a turn-on circuit 906 of the AP, so as to power on a main circuit of the AP.

Still as shown in FIG. 7, the communication port 701 of the local area network switch is accessed to the network through an uplink 705, and the local area network switch receives messages from the network and sends messages to the network through its communication port 701, including receiving a control instruction from the network management server. Multiple downlink network ports 702 is included in the local area network switch, where some are connected to the external output port 703 to connect multiple Ethernet devices. Another downlink network port 702 is connected to the communication interface 714 of the control device 704 through an internal connection line 706, and the communication interface 714 of the control device 704 is also an Ethernet interface. The control device 704 may work as an independent device, which has its own MAC address and IP address. The control port 724 of the control device 704 is also connected to the output port 703 of the local area network switch through two internal lines respectively. The output port 703 of the local area network switch is connected to the external Ethernet devices by category-5 cables 707. The category-5 cables 707 have 4 pairs (8 wires) in total, but not all of them are used. Therefore, one pair of idle lines can be used as an external connection of the control port 724 of the control device 704. At the AP side, an Ethernet interface 718 of the AP and a turn-on control circuit 728 are connected to a network port 738 of the AP in the same way through network cables. It should be noted that, the local area network switch shown in FIG. 7 further includes devices and circuits such as a CPU and a memory, which are not shown in FIG. 7, but should be understood by persons skilled in the art.

This embodiment provides a local area network switch, where the control device is embedded into the local area network switch, so as to save the space occupied by superfluous physical devices, and meanwhile, automatically controls to turn on APs in the same coverage area when the service traffic is relatively small, utilizes resources rationally, saves labor costs at the same time, and improves the work efficiency.

Figure 10:
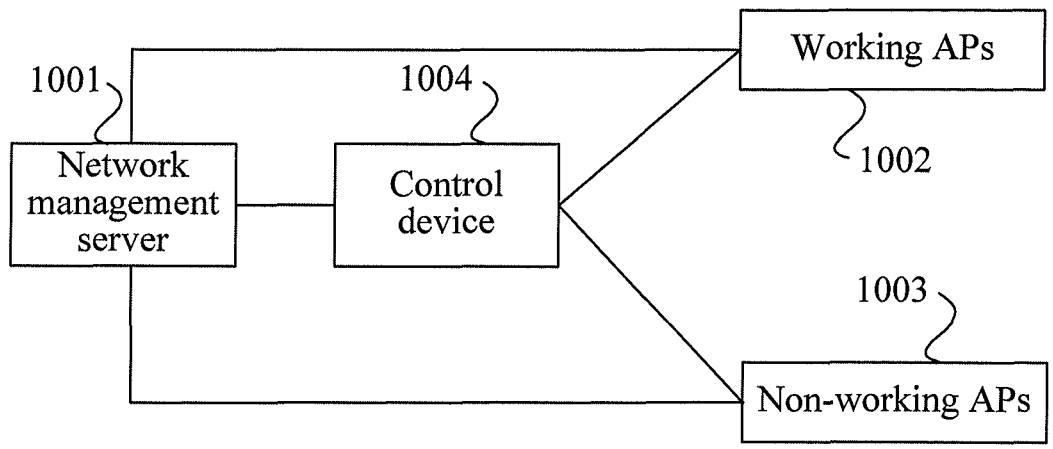
FIG. 10 is a schematic structural diagram of an embodiment of a system for controlling APs according to the present invention.

FIG. 10 is a schematic structural diagram of one embodiment of a system for controlling APs according to the present invention. As shown in FIG. 10, an embodiment of the present invention provides a system for controlling APs, where the system includes a network management server 1001, one or more working APs 1002, and one or more non-working APs 1003. The network management server 1001 is configured to receive load information on the one or more working APs 1002 in a coverage area, judge a current overall capacity of the coverage area according to the load information, and send a turn-off instruction message or turn-on instruction message according to a judgment result. When judging that a current capacity is larger than an upper capacity limit, the network management server 1001 controls to turn on one non-working AP 1003 in the coverage area; when judging that the current capacity is smaller than a lower capacity limit, the network management server 1001 controls to turn off one working AP 1002 in the coverage area. The one or more working APs 1002 are configured to send the load information to the network management server 1001, and be turned off under control of the network management server 1001. The one or more non-working APs 1003 are configured to be turned on under control of the network management server 1001.

Furthermore, the system for controlling APs provided by this embodiment further includes a control device 1004, configured to receive the turn-on instruction message sent by the network management server 1001, and control to turn on a non-working AP 1003 designated by the turn-on instruction message according to the turn-on instruction message. The control device 1004 controls to turn on the non-working AP 1003 by sending a turn-on signal, a remote wake-up frame, or a ZigBee signal to the non-working AP 1003 designated by the turn-on instruction message.

This embodiment provides a system for controlling APs, which automatically controls to turn on or off APs in the same coverage area according to the service traffic, utilizes resources rationally, saves labor costs at the same time, and improves the work efficiency through a network management server and a control device.

Figure 11:
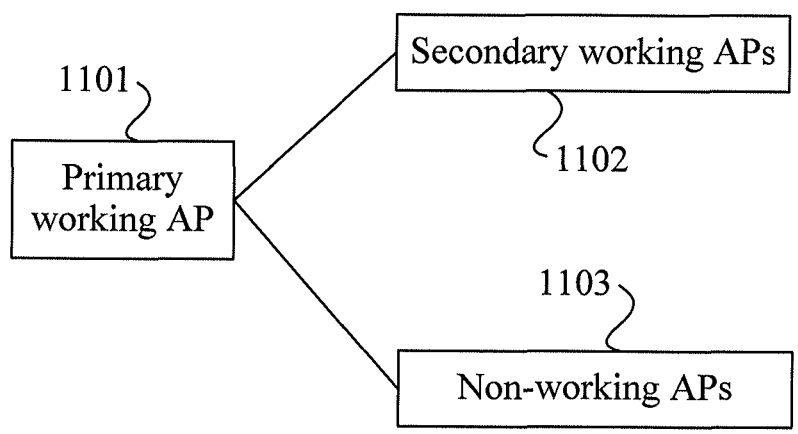
FIG. 11 is a schematic structural diagram of another embodiment of a system for controlling APs according to the present invention.

FIG. 11 is a schematic structural diagram of another embodiment of the system for controlling APs according to the present invention. As shown in FIG. 11, this embodiment provides another system for controlling APs, including a primary working AP 1101, one or more secondary working APs 1102, and one or more non-working APs 1103. The primary working AP 1101 is configured to receive first load information on the secondary working APs 1102 in a coverage area, and judge a current overall capacity of the coverage area according to the first load information and load information on the primary working AP 1101. When judging that the current overall capacity is larger than an upper limit of an overall capacity, the primary working AP 1101 controls to turn on one non-working AP 1103 in the coverage area; when judging that the current overall capacity is smaller than a lower limit of the overall capacity, the primary working AP 1101 controls to turn off one secondary working AP 1102. The secondary working APs 1102 are configured to send the load information to the primary working AP 1101, and be turned off under control of the primary working AP 1101. The non-working APs 1103 are configured to be turned on under control of the primary working AP 1101.

Furthermore, the primary working AP 1101 controls to turn on the non-working AP 1103 by sending a turn-on signal, a remote wake-up frame, or a ZigBee signal to the non-working AP 1103. The primary working AP 1101 sends a turn-off instruction message to one secondary working AP 1102 in the coverage area through the WiFi protocol, and controls to turn off the secondary working AP 1102 according to the turn-off instruction message.

This embodiment provides a system for controlling APs, where a primary working AP controls to turn on or off other APs in a coverage area according to load information on APs in the coverage area, which automatically controls to turn on or off APs in the same coverage area according to the service traffic, utilizes resources rationally, saves labor costs at the same time, and improves the work efficiency.

Finally, it should be noted that the above embodiments are merely provided for describing the technical solutions of the present invention, but are not intended to limit the present invention. Although the present invention has been described in detail with reference to the embodiments, it should be understood by persons of ordinary skill in the art that: modifications may still be made to the technical solutions described in the above embodiments, or equivalent replacements may still be made to some technical features, and these modifications and replacements do not make the essence of corresponding technical solutions depart from the spirit and scope of the technical solutions in the embodiments of the present invention.

What is claimed is:

1. A method for controlling access points (APs) operating within a Wireless Fidelity (WiFi) network, comprising:
receiving by a management server, load information on working APs in a coverage area, wherein the management server and the working APs in the coverage area are within the same WiFi network;
judging by the management server, a current overall capacity of the coverage area according to the load information; and
controlling by the management server, APs in the coverage area according to a judgment result, wherein the controlling of the APs in the coverage area comprising the management server performing one of:
when it is judged that the current overall capacity of the coverage area is greater than a upper limit of the overall capacity and that the current overall capacity of the coverage area is a rising trend, directly turning on a non-working AP in the coverage area by sending a first remote wake-up frame or sending a first ZigBee signal to a ZigBee communication module of the non-working AP; and
when it is judged that the current overall capacity of the coverage area is smaller than a lower limit of the overall capacity and that the current overall capacity of the coverage area is a non-rising trend, directly turning off a working AP in the coverage area by directly sending a first turn-off instruction message to the working AP in WiFi protocol.

2. The method for controlling APs according to claim 1, wherein the controlling to turn on the non-working AP in the coverage area comprises: the management server sending a first turn-on instruction message to a control device through an unused pair of wires in a cable connecting between the management server and the control device, wherein the control device is a separate network switch within the same coverage area, but remotely located from the management server, and controlling to turn on the non-working AP designated by the first turn-on instruction message through the control device.

3. The method for controlling APs according to claim 2, wherein the controlling to turn on the non-working AP designated by the first turn-on instruction message through the control device comprises one of:
sending a first turn-on signal to the non-working AP designated by the first turn-on instruction message through the control device, and controlling to turn on the non-working AP by controlling a relay in the non-working AP through the first turn-on signal;
sending a second remote wake-up frame to the non-working AP designated by the first turn-on instruction message through the control device, and controlling to turn on the non-working AP through the second remote wake-up frame; or
sending a second ZigBee signal to a ZigBee communication module of the non-working AP designated by the first turn-on instruction message through the ZigBee communication module of the control device, and controlling to turn on the non-working AP through the second ZigBee signal.

4. The method for controlling APs according to claim 1, wherein:
the working APs comprises a primary working AP and secondary working APs;
the secondary working APs reporting respective load information to the primary working AP, and
the primary working AP reporting own load information and the load information on the secondary working APs to the management server; and the controlling to turn on the non-working AP in the coverage area comprises:
the management server sending a second turn-on instruction message directly to the primary working AP, and
the primary working AP controlling through sending a third remote wake-up frame or a third ZigBee signal to turn on the non-working AP designated by the second turn-on instruction message.

5. The method for controlling APs according to claim 4, wherein the controlling to turn off the working AP in the coverage area comprises: controlling to turn off one secondary working AP in the coverage area by the primary AP sending a second turn-off instruction message to the secondary working AP in WiFi protocol.

6. The method for controlling APs according to claim 4, wherein the controlling to turn on the non-working AP designated by the second turn-on instruction message through the primary working AP comprises the primary AP performing one of:
sending a second turn-on signal to the non-working AP designated by the second turn-on instruction message through a control circuit in the primary working AP, and controlling to turn on the non-working AP by controlling a relay in the non-working AP;
sending the third remote wake-up frame to the non-working AP designated by the second turn-on instruction message through an Ethernet local area network switching circuit in the primary working AP, and controlling to turn on the non-working AP through the third remote wake-up frame; or
sending the third ZigBee signal to the ZigBee communication module of the non-working AP designated by the second turn-on instruction message through a ZigBee communication module in the primary working AP, and controlling to turn on the non-working AP through the third ZigBee signal.

7. A method for controlling access points (APs) operating within a Wireless Fidelity (WiFi) network, comprising:
receiving, by a primary working AP, load information on secondary working APs in a coverage area, wherein the primary working AP and the secondary working APs are within the same coverage area of the WiFi network;
judging, by the primary working AP, a current overall capacity of the coverage area according to own load information and the load information on the secondary working APs; and
controlling, by the primary working AP, APs in the coverage area according to a judgment result, wherein the controlling of the APs in the coverage area comprising the primary working AP performing one of:
when it is judged that the current overall capacity of the coverage area is greater than a upper limit of the overall capacity and that the current overall capacity of the coverage area is a rising trend, directly turning on a non-working AP in the coverage area by sending a remote wake-up frame or sending a ZigBee signal to a ZigBee communication module of the non-working AP; and
when it is judged that the current overall capacity of the coverage area is smaller than a lower limit of the overall capacity and that the current overall capacity of the coverage area is a non-rising trend, directly turning off a working AP in the coverage area by sending a turn-off instruction message to the working AP in WiFi protocol.

8. The method for controlling APs according to claim 7, wherein the controlling by the primary working AP to turn on the non-working AP in the coverage area comprises one of:
sending, by the primary working AP, a turn-on signal to the non-working AP in the coverage area, and controlling to turn on the non-working AP by controlling a relay in the non-working AP through the turn-on signal; or sending, by the primary working AP, a remote wake-up frame to the non-working AP in the coverage area, and controlling to turn on the non-working AP through the remote wake-up frame; or
sending, by the primary working AP, a ZigBee signal to a ZigBee communication module of the non-working AP in the coverage area through a ZigBee communication module of the primary working AP, and controlling to turn on the non-working AP through the ZigBee signal.

9. The method for controlling APs according to claim 7, wherein the controlling by the primary working AP to turn off one secondary working AP in the coverage area comprises:
controlling, by the primary working AP, to turn off one secondary working AP in the coverage area by sending a turn-off instruction message to the secondary working AP through the Wireless Fidelity (WiFi) protocol.

10. A network management server operating within a Wireless Fidelity (WiFi) network, comprising:
a first receiving module, configured to receive load information on working access points (APs) in a coverage area, wherein the network management server and the working APs in the coverage area are within the same WiFi network;
a first judgment module, configured to judge a current overall capacity of the coverage area according to the load information received by the first receiving module; and
a first control module, configured to control APs in the coverage area according to a judgment result of the first judgment module, wherein the first control module comprises:
a first turn-on control unit, configured to when it is judged that the current overall capacity of the coverage area is in a greater than a upper limit of the overall capacity and that the current overall capacity of the coverage area is a rising trend, directly turn on a non-working AP in the coverage area by sending a first remote wake-up frame or sending a first ZigBee signal to a ZigBee communication module of the non-working AP; and
a first turn-off control unit, configured to when it is judged that the current overall capacity of the coverage area is in a smaller than a lower limit of the overall capacity and that the current overall capacity of the coverage area is a non-rising trend, directly turn off a working AP in the coverage area by directly sending a first turn-off instruction message to the working AP in WiFi protocol.

11. The network management server according to claim 10, wherein:
the first turn-on control unit is specifically configured to send a first turn-on instruction message to a control device through an unused pair of wires in a cable connecting between the management server and the control device, wherein the control device is a separate network switch within the same coverage area, but remotely located from the management server, and control to turn on the non-working AP designated by the first turn-on instruction message.

12. The network management server according to claim 10, wherein: the working AP comprises a primary working AP and secondary working APs, the secondary working APs report respective load information to the primary working AP, and the first receiving module is specifically configured to receive through the primary AP load information on both the primary working AP and the secondary working APs in the coverage area;
the first turn-on control unit is specifically configured to send a second turn-on instruction message directly to the primary working AP and control to turn on the non-working AP through sending a second remote wake-up frame or a second ZigBee signal designated by the second turn-on instruction message when the judgment result of the first judgment module is that the current overall capacity is larger than the upper limit of the overall capacity and the current overall capacity is in the rising trend; and
the first turn-off control unit is specifically configured to control to turn off one secondary working AP in the coverage area by sending a second turn-off instruction message to the secondary working AP through the primary working AP when the judgment result of the first judgment module is that the current overall capacity is smaller than the lower limit of the overall capacity and the current overall capacity is in the non-rising trend.

13. A primary working access point (AP) operating within a Wireless Fidelity (WiFi) network, comprising:
a receiving module, configured to receive load information on secondary working APs in a coverage area, wherein the primary working AP and the secondary APs in the coverage area are within the same WiFi network;
a judgment module, configured to judge a current overall capacity of the coverage area according to load information on the primary working AP and the load information on the secondary working APs received by the receiving module; and
a control module, configured to control APs of the coverage area according to a judgment result of the judgment module, wherein the control module comprises:
a turn-on control unit, configured to when it is judged that the current overall capacity of the coverage area is greater than a upper limit of the overall capacity and that the current overall capacity of the coverage area is a rising trend, directly turns on a non-working AP in the coverage area by sending a remote wake-up frame or sending a ZigBee signal to a ZigBee communication module of the non-working AP; and
a turn-off control unit, configured to when it is judged that the current overall capacity of the coverage area is smaller than a lower limit of the overall capacity and that the current overall capacity of the coverage area is a non-rising trend, directly turns off a working AP in the coverage area by sending a turn-off instruction message to the working AP in WiFi protocol.

14. A system for controlling access points (APs) operating within a Wireless Fidelity (WiFi) network, comprising:
a network management server, configured to receive load information on one or more working APs in a coverage area, wherein the management server and the one or more working APs in the coverage area are within the same WiFi network, judge a current overall capacity of the coverage area according to the load information, wherein the controlling of the APs in the coverage area comprising the management server performing one of:
when it is judged that the current overall capacity of the coverage area is in a greater than a upper limit of the overall capacity and that the current overall capacity of the coverage area is a rising trend, directly turning on a non-working AP in the coverage area by sending a first remote wake-up frame or sending a first ZigBee signal to a ZigBee communication module of the non-working AP; and
when it is judged that the current overall capacity of the coverage area is in a smaller than a lower limit of the overall capacity and that the current overall capacity of the coverage area is a non-rising trend, directly turning off a working AP in the coverage area by directly sending a first turn-off instruction message to the working AP in WiFi protocol;
the one or more working APs, configured to send the load information to the network management server, and be directly turned off by the network management server according to the turn-off instruction message; and
the one or more non-working APs, configured to be directly turned on by the network management server according to the turn-on instruction message.

15. The system for controlling APs according to claim 14, further comprising:
a control device, configured to receive the turn-on instruction message sent by the network management server through an unused pair of wires in a cable connecting between the management server and the control device, wherein the control device is a separate network switch within the same coverage area, but remotely located from the management server, and control to turn on the non-working AP designated by the turn-on instruction message according to the turn-on instruction message.

16. The system for controlling APs according to claim 15, wherein the control device controls to turn on the non-working AP by sending a turn-on signal, a second remote wake-up frame, or a second ZigBee signal to the non-working AP designated by the turn-on instruction message.

17. A system for controlling access points (APs) operating within a Wireless Fidelity (WIFI) network, comprising:
a primary working AP, configured to receive first load information on secondary working APs in a coverage area, wherein the primary working AP and the secondary working Aps in the coverage area are within the same WiFi network, judge a current overall capacity of the coverage area according to the first load information and own load information, and control APs in the coverage area according to a judgment result, wherein the controlling of the APs in the coverage area comprising the primary AP performing one of:
when it is judged that the current overall capacity of the coverage area is greater than a upper limit of the overall capacity and that the current overall capacity of the coverage area is a rising trend, directly turning on a non-working AP in the coverage area by sending a remote wake-up frame or sending a ZigBee signal to a ZigBee communication module of the non-working AP; and
when it is judged that the current overall capacity of the coverage area is smaller than a lower limit of the overall capacity and that the current overall capacity of the coverage area is a non-rising trend, directly turning off a working AP in the coverage area by sending a turn-off instruction message to the working AP in WiFi protocol;
one or more of the secondary working APs, configured to send the first load information to the primary working AP, and be turned off under control of the primary working AP; and
one or more non-working APs, configured to be turned on under control of the primary working AP.

* * * * *